(12) United States Patent
Akamine et al.

(10) Patent No.: US 12,038,495 B2
(45) Date of Patent: Jul. 16, 2024

(54) OBJECT TRACKING APPARATUS

(71) Applicant: DENSO CORPORATION, Kariya (JP)

(72) Inventors: Yusuke Akamine, Nisshin (JP);
Takuya Takayama, Kariya (JP);
Yasuyuki Miyake, Kariya (JP)

(73) Assignee: DENSO CORPORATION, Kariya (JP)

( * ) Notice: Subject to any disclaimer, the term of this patent is extended or adjusted under 35 U.S.C. 154(b) by 520 days.

(21) Appl. No.: 17/237,593

(22) Filed: Apr. 22, 2021

(65) Prior Publication Data

US 2021/0239825 A1 Aug. 5, 2021

Related U.S. Application Data

(63) Continuation of application No. PCT/JP2019/041639, filed on Oct. 24, 2019.

(30) Foreign Application Priority Data

Oct. 24, 2018 (JP) .................................. 2018-200068

(51) Int. Cl.
*G01S 13/72* (2006.01)
*G01S 7/41* (2006.01)
(Continued)

(52) U.S. Cl.
CPC ............ *G01S 13/723* (2013.01); *G01S 7/415* (2013.01); *G01S 13/52* (2013.01); *G01S 13/584* (2013.01); *G01S 13/931* (2013.01)

(58) Field of Classification Search
CPC .. G01S 13/66–726; G01S 7/415; G01S 13/52; G01S 13/931; G01S 2013/9323;
(Continued)

(56) References Cited

U.S. PATENT DOCUMENTS

| 8,812,226 B2* | 8/2014 | Zeng ..................... G01S 13/931 |
| | | 382/103 |
| 2016/0162743 A1* | 6/2016 | Chundrlik, Jr. ........ G06V 20/58 |
| | | 348/148 |
| 2019/0049968 A1* | 2/2019 | Dean ........................ A61G 5/04 |

FOREIGN PATENT DOCUMENTS

JP 2010-032304 A 2/2010

OTHER PUBLICATIONS

K. Li et al., "Multitarget Tracking with Doppler Ambiguity," IEEE Transactions on Aerospace and Electronic Systems, vol. 49, No. 4, pp. 2640-2656, Oct. 2013.

* cited by examiner

*Primary Examiner* — Matthew M Barker
(74) *Attorney, Agent, or Firm* — MASCHOFF BRENNAN

(57) ABSTRACT

An object tracking apparatus generates a plurality of target candidates in which ambiguity in velocity is assumed for an object detected for a first time, calculates a current prediction value of a state quantity of each target candidate from a past estimation value of the state quantity of each target candidate, using one filter among a plurality of filters, and calculates the current estimation value of the state quantity of the target candidate from each of the calculated prediction values and a current observation value that matches each prediction value. The object tracking apparatus deletes the target candidate of which a determined likelihood is less than a preset threshold among the target candidates, and switches a used filter to a filter that has a larger number of state variables among the filters, in response to the target candidate being deleted and the total number of target candidates decreasing.

16 Claims, 12 Drawing Sheets

(51) Int. Cl.
*G01S 13/52* (2006.01)
*G01S 13/58* (2006.01)
*G01S 13/931* (2020.01)

(58) Field of Classification Search
CPC ........... G01S 2013/9324; G01S 15/931; G01S 17/931; G01S 13/584
See application file for complete search history.

FIG.6
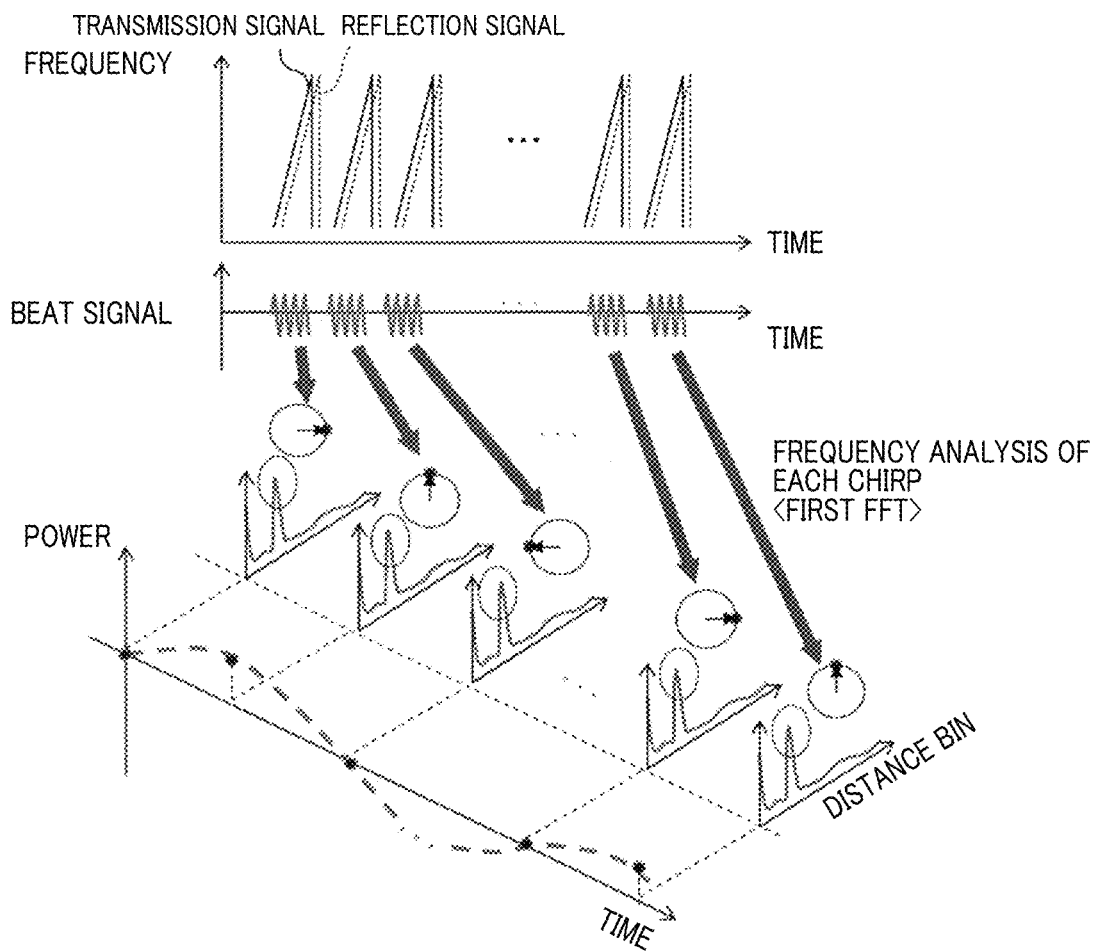
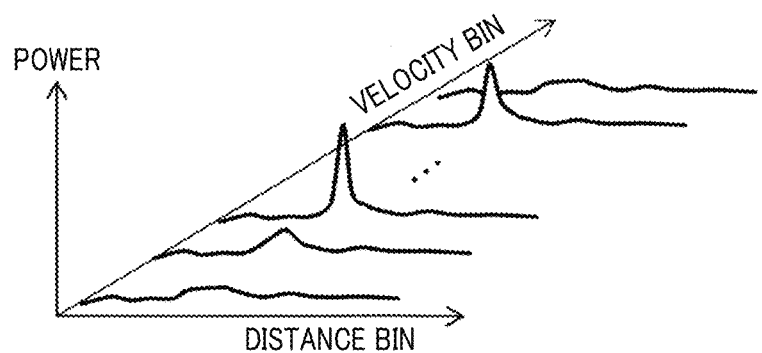

FIG.8
ACTUAL MOVEMENT OF TARGET
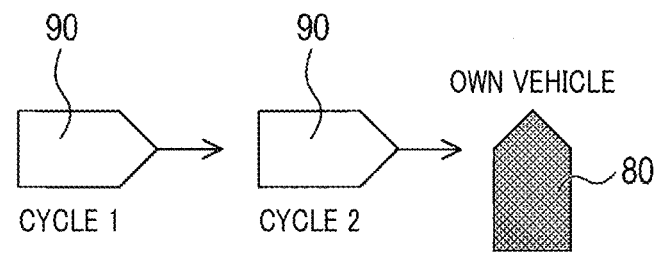
TRACKING
ALIASING OF +1 TIME PREDICTION VALUE    ALIASING OF 0 TIMES PREDICTION VALUE    ALIASING OF -1 TIME PREDICTION VALUE
 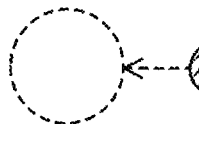 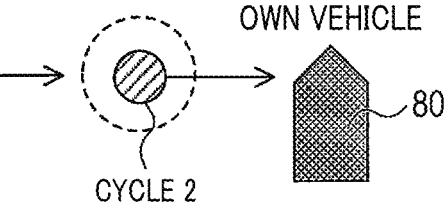
CYCLE 1 OBSERVATION VALUE    CYCLE 2 OBSERVATION VALUE

OBJECT TRACKING APPARATUS

CROSS-REFERENCE TO RELATED APPLICATIONS

The present application is a continuation application of International Application No. PCT/JP2019/041639, filed on Oct. 24, 2019, which claims priority to Japanese Patent Application No. 2018-200068, filed on Oct. 24, 2018. The contents of these applications are incorporated herein by reference in their entirety.

BACKGROUND

Technical Field

The present disclosure relates to a technology for object tracking in which an object is tracked based on sensor information.

RELATED ART

When an object is tracked based on sensor information, if aliasing of a relative velocity of the object that is observed by a sensor occurs, the relative velocity may have ambiguity. For example, when the relative velocity is determined from a phase rotation of a frequency component that is continuously detected for a same object, an actual phase may be φ+2π×n (n being an integer) relative to a detected phase (p. The relative velocity cannot be identified.

SUMMARY

An aspect of the present disclosure provides an object tracking apparatus.

The object tracking apparatus detects an object that is present in a vicinity of a sensor from sensor information detected by the sensor, calculates a relative velocity of the object relative to the sensor as one observation value for each object detected, calculates a distance from the sensor to the object as one observation value for each object detected, and generates a plurality of target candidates in which ambiguity in velocity is assumed for an object that is detected for a first time.

The object tracking apparatus has a plurality of filters of which state variables differs from each other in number, calculates a current prediction value of a state quantity of each target candidate from a past estimation value of the state quantity of each target candidate, using one filter among the plurality of filters, calculates the current estimation value of the state quantity of the target candidate from each of the calculated prediction values and a current observation value that matches each prediction value, and matches each prediction value of the state quantity of the target candidate and the observation value.

The object tracking apparatus determines a likelihood of each of the plurality of target candidates generated for a single object detected being a true target, deletes a target candidate of which the determined likelihood is less than a preset threshold among the plurality of target candidates, or deletes a predetermined number of target candidates in order from the target candidate of which the likelihood is lowest among the plurality of target candidates, and switches a used filter to a filter that has a larger number of state variables among the plurality of filters, in response to the target candidate being deleted and the total number of target candidates decreasing.

BRIEF DESCRIPTION OF THE DRAWINGS

In the accompanying drawings:

FIG. 6 is an explanatory diagram of an overview of a two-dimensional FFT process;

FIG. 8 is a diagram of actual movement of a target and an aspect of tracking;

DESCRIPTION OF THE EMBODIMENTS

Figure 1:
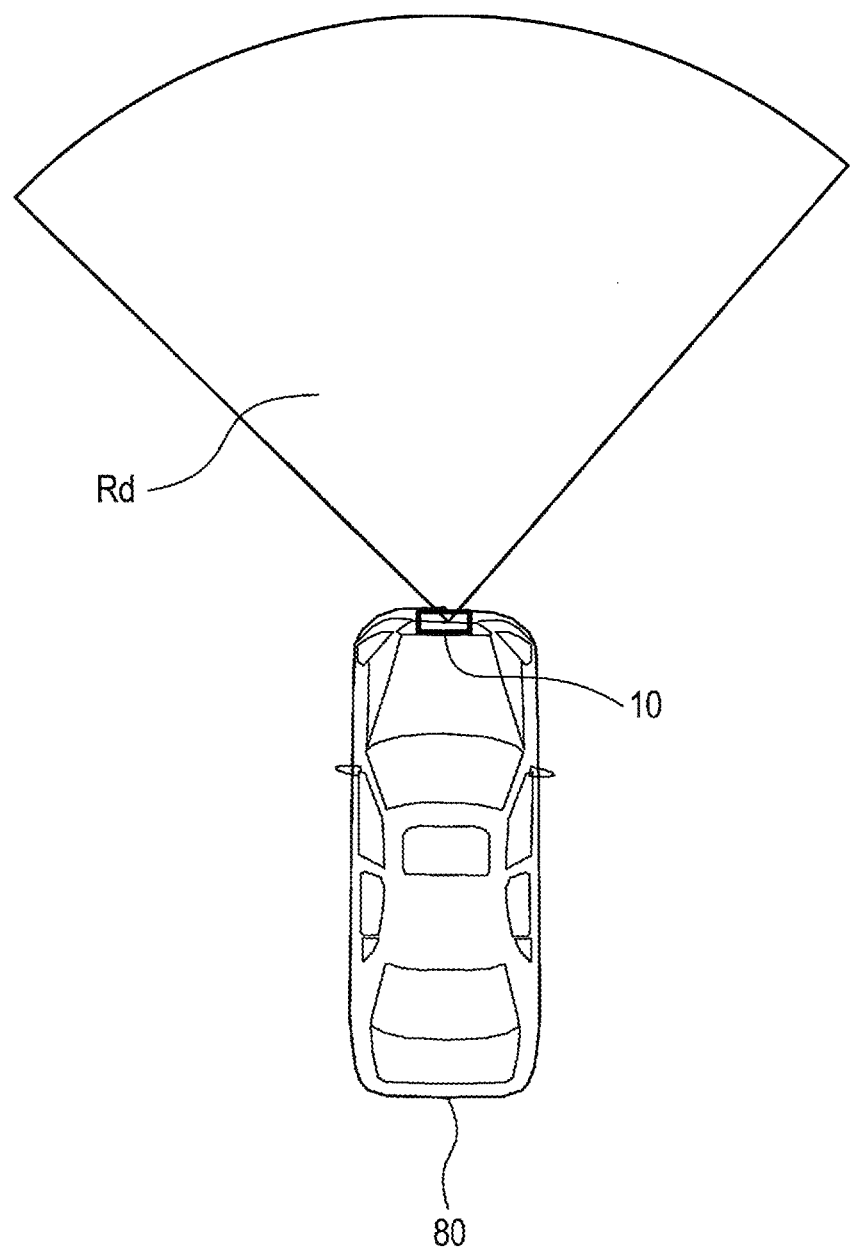
FIG. 1 is a diagram of an example of a mounting position and a detection range of a radar according to a first embodiment.

A technology for identifying a true velocity by tracking a plurality of targets regarding which this ambiguity in velocity is assumed is proposed in K. Li et al., "Multitarget Tracking with Doppler Ambiguity," IEEE Transactions on Aerospace and Electronic Systems, vol. 49, no. 4, pp. 2640-2656, October 2013.

When a plurality of targets regarding which ambiguity in velocity is assumed are tracked, a problem occurs in that computational load increases in accompaniment with increase in a number of targets. When driving assistance of a vehicle is performed based on tracking information of a target, because the tracking information of the target is used for warnings to a driver and control of the vehicle, real-time property is required of the tracking information of the target.

However, as a result of detailed review by the inventors, an issue has been found in that, when the computational load increases when a target is tracked, a real-time property of the tracking information of the target is compromised, possibly leading to delays in warnings and control.

It is thus desired to provide an object tracking apparatus that is capable of tracking a target with high accuracy while suppressing overall computational load.

An exemplary embodiment of the present disclosure provides an object tracking apparatus that includes: an object detecting unit, a velocity calculating unit, a distance calculating unit, a candidate generating unit, a filter processing unit, a matching processing unit, a candidate deleting unit, and a filter selecting unit.

The object detecting unit is configured to detect an object that is present in a vicinity of a sensor from sensor information detected by the sensor.

The velocity calculating unit is configured to calculate a relative velocity of the object relative to the sensor as one observation value for each object detected by the object detecting unit.

The distance calculating unit is configured to calculate a distance from the sensor to the object as one observation value for each object detected by the object detecting unit.

The candidate generating unit is configured to generate a plurality of target candidates in which ambiguity in velocity is assumed for an object that is detected for a first time by the object detecting unit.

The filter processing unit is configured to have a plurality of filters of which state variables differs from each other in number, calculate a current prediction value of a state quantity of each target candidate from a past estimation value of the state quantity of each target candidate that is currently held, using one filter among the plurality of filters, and calculate the current estimation value of the state quantity of the target candidate from each of the calculated prediction values and a current observation value that matches each prediction value.

The matching processing unit is configured to match each prediction value of the state quantity of the target candidate and the observation value.

The candidate deleting unit is configured to determine a likelihood of each of the plurality of target candidates generated for a single object detected by the object detecting unit being a true target, and delete a target candidate of which the determined likelihood is less than a preset threshold among the plurality of target candidates, or deletes a predetermined number of target candidates in order from the target candidate of which the likelihood is lowest among the plurality of target candidates.

The filter selecting unit is configured to switch the filter used by the filter processing unit to a filter that has a larger number of state variables among the plurality of filters, in response to the target candidate being deleted by the candidate detecting unit and the total number of target candidates decreasing.

According to the exemplary embodiment of the present disclosure, a plurality of target candidates in which ambiguity in velocity is presumed is generated for an object that is detected for the first time. Then, the current prediction value of the state quantity is calculated from the past estimation value of the state quantity of each target candidate using one filter among the plurality of filters. Furthermore, the current estimation value of the state quantity of each target candidate is calculated from the current prediction value and the current observation value that matches the prediction value. That is, each of the target candidates is tracked.

Then, the target candidate having the lowest likelihood of being the true target among the plurality of target candidates is deleted. The plurality of filters includes a plurality of filters of which state variables differs from each other in number. Tracking accuracy regarding the target candidate becomes higher when a filter with a larger number of state variables is used. However, computational load increases.

Here, when the number of target candidates is large, a purpose of tracking the target candidates is to select the true target from the plurality of target candidates. Therefore, tracking accuracy regarding the target may be low. However, because the number of target candidates is large, the computational load of the filter process for each target candidate should be suppressed. Meanwhile, after the number of target candidates becomes one, the purpose of tracking the target candidate is to use tracking information for warnings and vehicle control.

Therefore, the tracking accuracy regarding the target is required to be high. However, because the number of target candidates is one, the computational load of the filter process for the target candidate may be high. Therefore, the filter that is used for the filter process is switched to a filter that has a larger number of state variables in response to the total number of target candidates decreasing. As a result, the target can be tracked with high accuracy while the overall computational load is suppressed.

Exemplary embodiments of the present disclosure will hereinafter be described with reference to the drawings.

First Embodiment

1. Configuration

First, a configuration of an object tracking apparatus 20 according to a first embodiment will be described with reference to FIGS. 1 to 3.

The object tracking apparatus 20 is mounted in a vehicle 80 and tracks an object in a vicinity of the vehicle 80 based on an observation signal that is detected by a radar 10. Tracking information of the object that is generated by the object tracking apparatus 20 is assumed to be used for traveling assistance of the vehicle 80.

The radar 10 is mounted in the vehicle 80. FIGS. 1 and 2 show examples of mounting positions of the radar 10. As shown in FIG. 1, the radar 10 may be mounted in a front center (such as a center of a front bumper) of the vehicle 80. An area that is ahead of and in the center of the vehicle 80 may be a detection area Rd.

Figure 2:
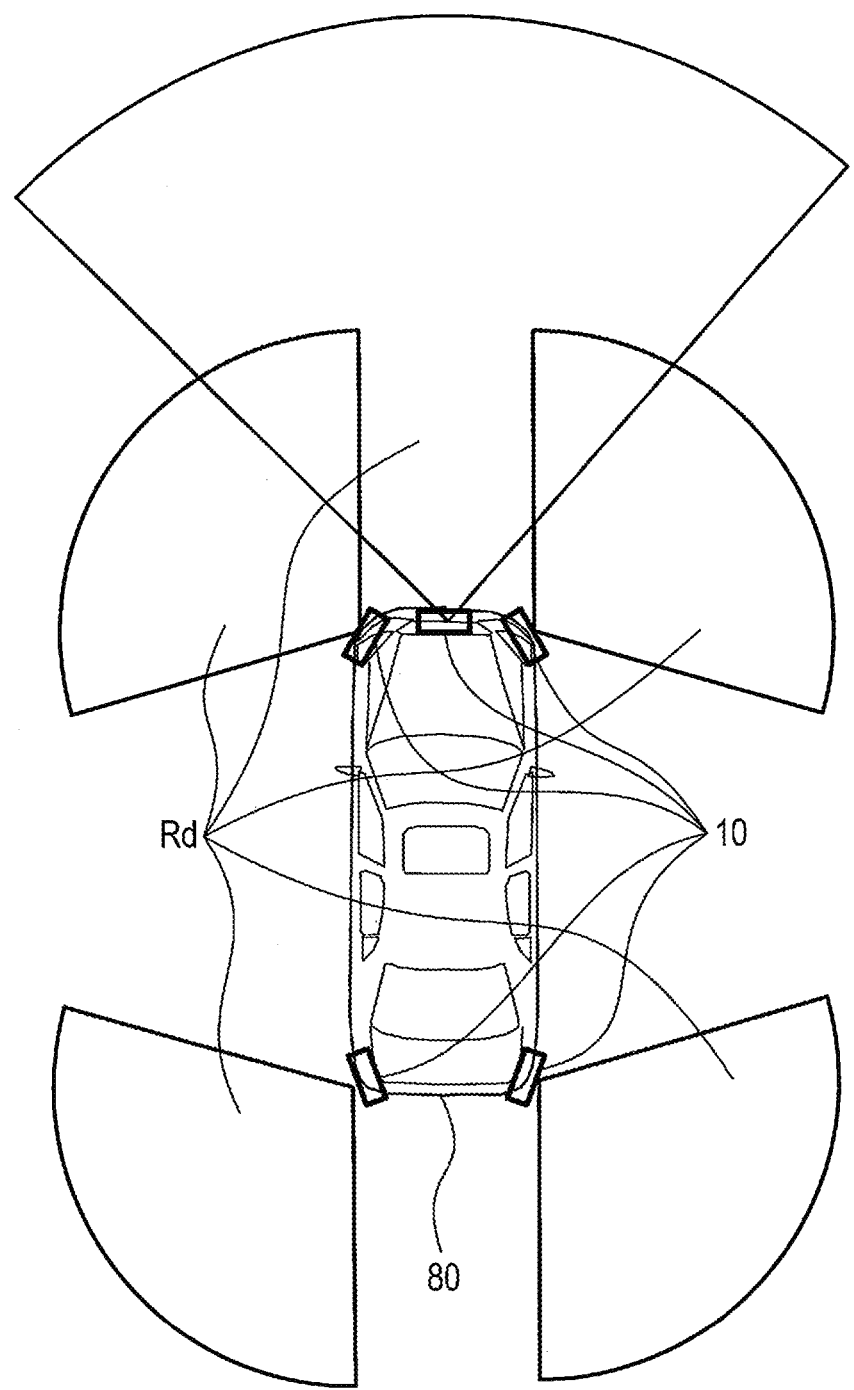
FIG. 2 is a diagram of another example of the mounting position and the detection range of the radar according to the first embodiment.

In addition, as shown in FIG. 2, the radar 10 may be mounted in five sections in the front center, and on a front left side, a front right side, a rear left side, and a rear right side of the vehicle 80. Areas in the front center, and on the front left side, the front right side, the rear left side, and the rear right side of the vehicle 80 may be the detection area Rd. A number of radars 10 mounted in the vehicle 80 and mounting positions may be selected as appropriate.

The radar 10 is a millimeter-wave radar that is of a type in which radar signals are transmitted and received, and a relative velocity is determined from a phase rotation of a frequency component that is continuously detected for a same object. According to the present embodiment, the radar 10 is a Fast Chirp Modulation (FCM)-type millimeter-wave radar that transmits and receives chirp signals. The chirp signals are radar signals that have been subjected to frequency modulation such that the frequency changes in a sawtooth shape. That is, the chirp signals are radar signals of which the frequency continuously increases or decreases.

The radar 10 includes a transmission array antenna and a reception array antenna. In a single observation, M chirp signals are transmitted from the transmission array antenna at a preset repetition period. M is an integer of 2 or more. In addition, the radar 10 receives, through the reception array antenna, reflection signals that are generated as a result of the M chirp signals being reflected by a target. Furthermore, the radar 10 calculates M beat signals from the transmitted M chirp signals and the M reflection signals, and each time the calculation is performed, transmits the M beat signals to the object tracking apparatus 20. The beat signal is a frequency difference signal of the chirp signal and the reflection signal, and corresponds to an observation signal.

According to the present embodiment, the radar corresponds to a sensor and the observation signal corresponds to sensor information.

The object tracking apparatus 20 includes a microcomputer that includes a central processing unit (CPU), a read-only memory (ROM), a random access memory (RAM), a memory, an input/output (I/O), and the like. The object tracking apparatus 20 actualizes various functions by the CPU running a program that is stored in the memory that is a non-transitory, tangible recording medium. In addition, a method corresponding to the program is performed as a result of the program being run.

Here, the object tracking apparatus 20 may be configured by a single microcomputer or a plurality of microcomputers. Furthermore, a method for actualizing the various functions of the object tracking apparatus 20 is not limited to software. Some or all of the functions may be actualized using hardware that combines logic circuits, analog circuits, and the like.

Figure 3:
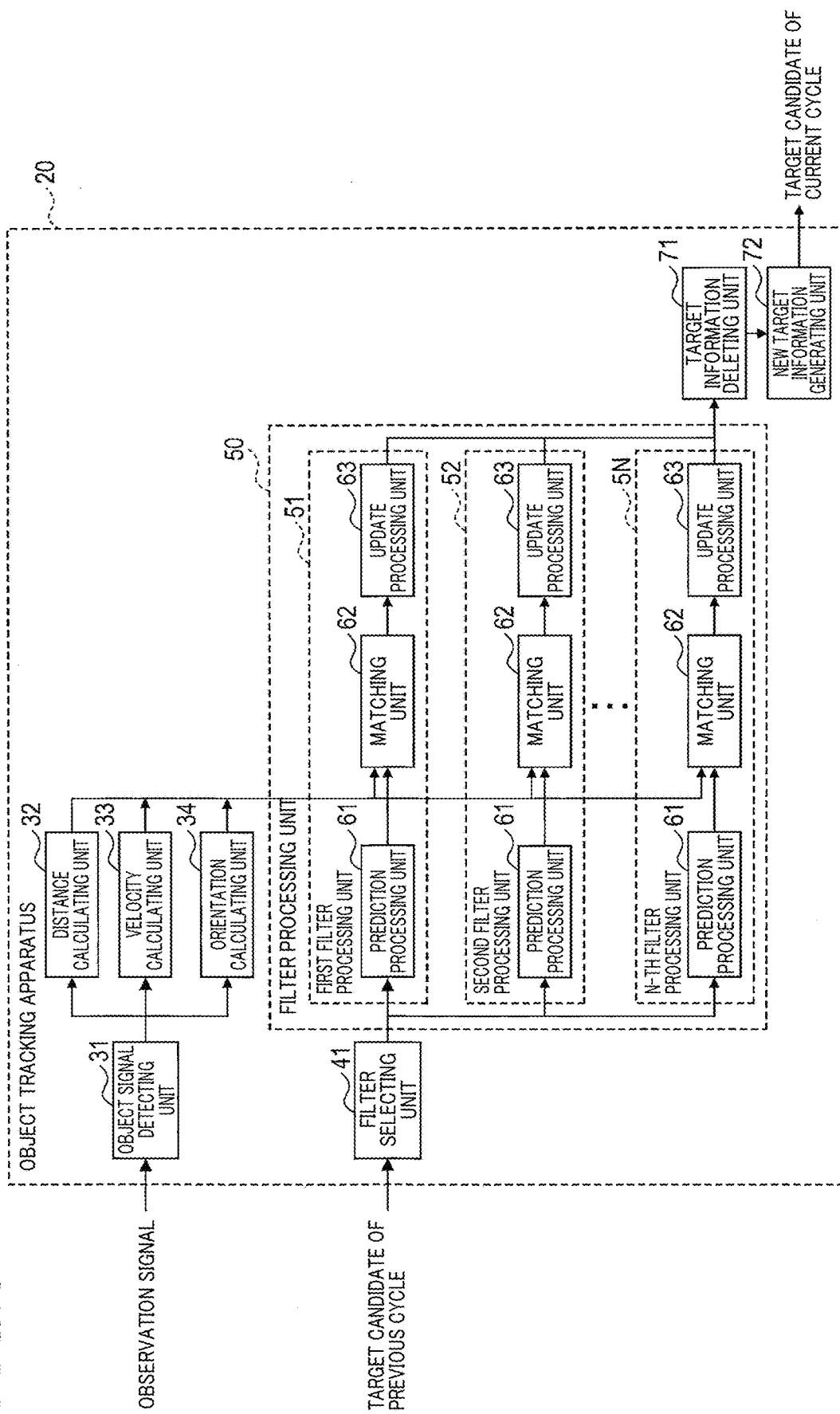
FIG. 3 is a block diagram of a configuration of an object tracking apparatus according to the first embodiment.

As shown in FIG. 3, the object tracking apparatus 20 provides functions of an object signal detecting unit 31, a distance calculating unit 32, a velocity calculating unit 33, an orientation calculating unit 34, a filter selecting unit 41, a filter processing unit 50, a target information deleting unit 71, and a new target information generating unit 72. The filter processing unit 50 includes N filter processing units that are first to Nth filter processing units 51 to 5N. N is an integer of 2 or more.

The first to Nth filter processing units 51 to 5N each include a prediction processing unit 61, a matching unit 62, and an update processing unit 63. The first to Nth filter processing units 51 to 5N use filters of which state variables differ from one another. The filter selecting unit 41 selects the filter processing unit to be used to track a target, among the first to Nth filter processing units, based on a tracking state. Computational load of the object tracking apparatus 20 increases as a filter with more state variables is used. Details of the various functions of the object tracking apparatus 20 will be described hereafter.

2. Processes 2-1. Target Information Generating Process

Figure 4:
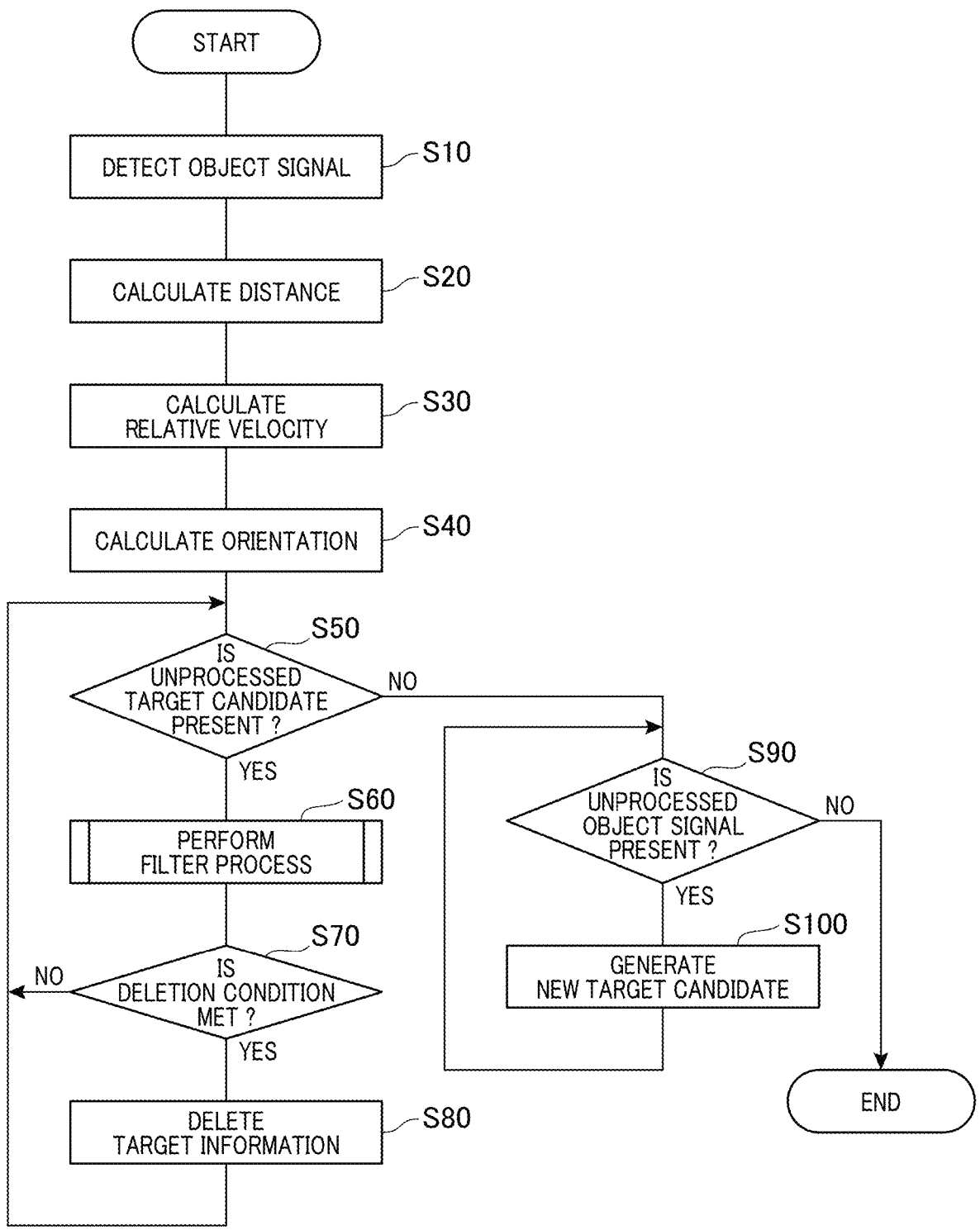
FIG. 4 is a flowchart of a target information generating process according to the first embodiment.

Next, processing steps in a target information generating process performed by the object tracking apparatus 20 will be described with reference to a flowchart in FIG. 4. The object tracking apparatus 20 repeatedly performs the target information generating process.

First, at S10, the object signal detecting unit 31 performs frequency analysis on a received observation signal and detects an object signal. Specifically, as shown in FIG. 6, the object signal detecting unit 31 performs a Fast Fourier Transform (FFT) process on each of the M beat signals as a first FFT process, and calculates M distance spectrums. The distance spectrum is a two-dimensional spectrum that expresses power relative to distance. Because the beat signal has a frequency component that is based on a distance to the object, a frequency BIN of the calculated distance spectrum corresponds to a distance BIN.

In addition, the object signal detecting unit 31 performs the FFT process on each distance BIN of the calculated M distance spectrums as a second FFT process, and calculates a distance velocity spectrum. The distance velocity spectrum is a three-dimensional spectrum that expresses power relative to distance and velocity. Then, the object signal detecting unit 31 searches the calculated distance velocity spectrum for a velocity BIN and a distance BIN that are peaks, and extracts the peak velocity BIN and distance BIN as an object signal that indicates presence of an object.

Next, at S20, the distance calculating unit 32 calculates a distance observation value from the distance BIN of the object signal extracted at S10. The distance is a distance from the radar 10 to the object. When a plurality of object signals are extracted at S10, the distance calculating unit 32 calculates the distance observation value for each object signal.

Next, at S30, the velocity calculating unit 33 calculates a relative velocity observation value for each object signal from the velocity BIN of the object signal extracted at S10. The relative velocity is a velocity of the object relative to the radar 10.

Next, at S40, the orientation calculating unit 34 applies an arrival direction estimation algorithm to the object signal, for each object signal, calculates an orientation spectrum that includes orientation information of the object, and calculates an orientation observation value from the calculated orientation spectrum. The orientation is an orientation of the object relative to the radar 10.

As a result of processes at S20 to S40 being performed, a combination of the distance observation value, the relative velocity observation value, and the orientation observation value is calculated for each object signal.

Then, when the object signal is a signal that indicates an object that is detected for a first time in a current cycle, in a new target information generating process at S100, described hereafter, the new target information generating unit 72 assumes ambiguity in velocity and generates a plurality of target candidates for each object signal.

Figure 7:
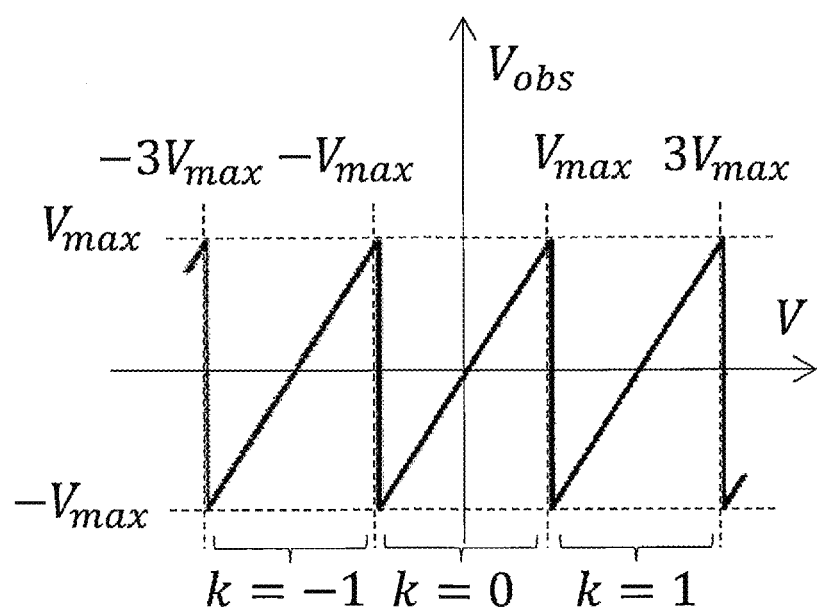
FIG. 7 is a diagram of aliasing of a velocity observed by the radar.

As shown in FIG. 6, the relative velocity observation value is a value that is calculated from a phase rotation amount φ of a frequency component of the M consecutive beat signals. Here, the detected phase rotation amount φ may actually be φ+2π·k, where k is an integer. Therefore, as shown in FIG. 7, the relative velocity observation value may be folded and is ambiguous. The new target information generating unit 72 assumes ambiguity in velocity and calculates a plurality of relative velocity observation values for each object signal that is detected for the first time. For example, the velocity calculating unit 33 assumes aliasing of −1 time, 0 times, and 1 time, and calculates three relative velocity observation values. Then, the new target information generating unit 72 generates target candidates that have velocity observation values that differ from one other. Therefore, in a current cycle, a plurality of target candidates may be present for an object signal that has been detected in the past.

Next, at S50, a filter selecting unit 41 determines whether an unprocessed target candidate is present in the current cycle among the target candidates held in the current cycle. Specifically, the filter selecting unit 41 determines whether a target candidate on which a filter process, described hereafter, has not been performed is present among the target candidates that are held in the current cycle. When an unprocessed target candidate is present, the filter selecting unit 41 proceeds to a process at S60. When an unprocessed target candidate is not present, the filter selecting unit 41 proceeds to a process at S90.

At S60, the filter selecting unit 41 and the filter processing unit 50 perform the filter process. The filter selecting unit 41 selects a filter processing unit among the first filter processing unit 51 to the Nth filter processing unit 5N, based on a number of target candidates that are held in the current cycle.

The selected filter processing unit calculates a prediction value of a state quantity of a target candidate in the current cycle from an estimation value of the state quantity of the target candidate in a previous cycle, using a filter. Then, from the calculated prediction value and a current observation value that matches the prediction value, the selected filter processing unit calculates a current estimation value of the state quantity of the corresponding target candidate, using the filter. Details of the state quantity and the filter will be described hereafter.

Specifically, as shown in FIG. 8, when another vehicle 90 is detected for the first time in cycle 1, an observation value is calculated from an observation signal of the other vehicle 90. Then, based on the calculated observation value, three estimation values in which aliasing of −1 time, 0 times, and 1 time is assumed are calculated. Three target candidates that have estimation values that differ from one another are generated.

Next, in cycle 2, the observation value is calculated from the observation signal of the other vehicle 90 in cycle 2, and for each target candidate, the prediction value of the state quantity in cycle 2 is calculated from the estimation value of the state quantity in cycle 1. Then, in cycle 2, because the prediction value of the target candidate regarding which aliasing of −1 times is assumed and the observation value match, the estimation value of the state quantity in cycle 2 is calculated from the prediction value of the target candidate regarding which aliasing of −1 times is assumed and the observation value.

Next, at S70, the target information deleting unit 71 determines a likelihood of the target candidate being a true target (hereafter, true-target likelihood), and determines whether the target candidate meets a deletion condition based on the determined true-target likelihood. The target information deleting unit 71 determines the true-target likelihood to be higher as a matching-established count between the prediction value of the target candidate and the observation value increases, and/or a difference between the prediction value of the target candidate and the observation value decreases.

The deletion condition is that the true-target likelihood is less than a preset threshold. Specifically, the deletion condition is that the matching-established count between the prediction value of the target candidate and the observation value is less than a count threshold, and/or the difference between the prediction value of the target candidate and the observation value is greater than a difference threshold.

Alternatively, the deletion condition may be that the target candidate is within a predetermined number from target candidates that have a lowest true-target likelihood among the plurality of target candidates. In this case, a target candidate to be deleted is a predetermined number of target candidates in order from the target candidate that has a lowest true-target likelihood among the plurality of target candidates. The predetermined number may be set based on the number of the plurality of target candidates. For example, when the number of target candidates is four or more, the predetermined number may be set to 2. When the number of target candidates is three or less, the predetermined number may be set to 1.

The target information deleting unit 71 proceeds to a process at S80 when determined that the deletion condition is met, and returns to the process at S50 when determined that the deletion condition is not met.

At S80, the target information deleting unit 71 deletes the target candidate that meets the deletion condition and returns to the process at S50. Subsequently, the processes at S50 to S80 are performed for a next target candidate. Then, when the target candidate finally becomes a single target candidate, the target information deleting unit 71 determines the single target candidate to be the true target.

Figure 9:
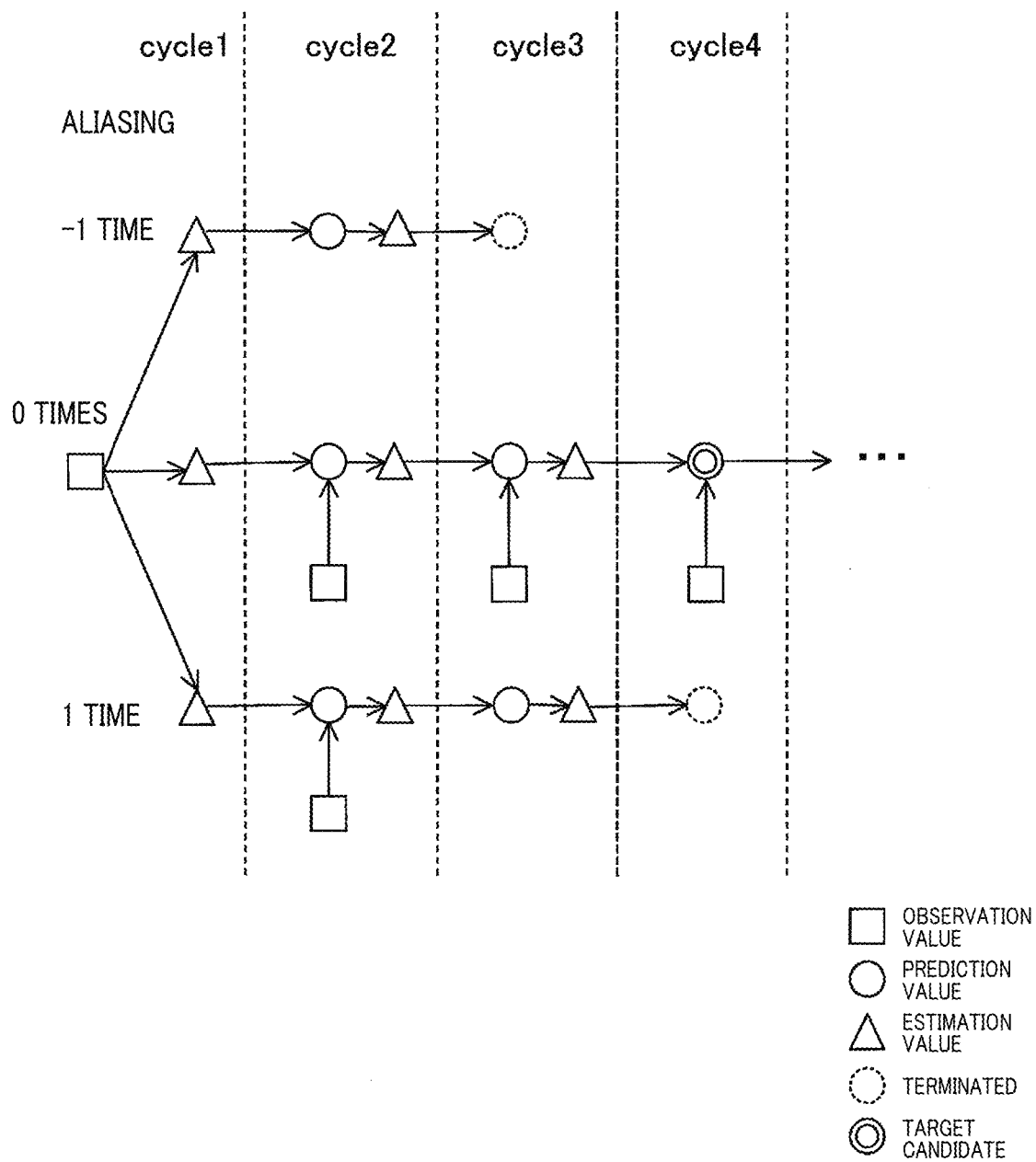
FIG. 9 is a diagram of a process by which true target is determined from a plurality of target candidates regarding which aliasing that differs from one another is assumed.

For example, as shown in FIG. 9, when a target is detected for the first time in cycle 1, the estimation values of three state quantities in which aliasing of −1 time, 0 times, and 1 time is assumed are calculated, and three target candidates of which the estimation values differ from one another are generated. Then, two observation values are calculated in cycle 2. One of the two observation values is noise or the observation value of an object that differs from the object detected in cycle 1.

In cycle 2, the prediction value of the target candidate regarding which aliasing of −1 time is assumed, among the three target candidates, does not match the observation value. Therefore, in cycle 3, the target candidate regarding which aliasing of −1 time is assumed is deleted. Meanwhile, in cycle 2, the prediction value of the target candidate regarding which aliasing of 0 times or 1 time is assumed, among the three target candidates, matches the observation value. Therefore, in cycle 2, the estimation values are calculated from the prediction values of these two target candidates and the observation values that match the prediction values.

In cycle 3, a single observation value is calculated. The prediction value of the target candidate regarding which aliasing of 1 time is assumed, among the two target candidates that are present in cycle 3, does not match the observation value. Therefore, in cycle 4, the target candidate regarding which aliasing of 1 time is assumed is deleted. Meanwhile, in cycle 3, the prediction value of the target candidate regarding which aliasing of 0 times is assumed matches the observation value.

Therefore, the estimation value is calculated from the prediction value of this target candidate and the observation value. Then, in cycle 4, only the target candidate regarding which aliasing of 0 times is assumed is present. Therefore, in cycle 4, the target candidate regarding which aliasing of 0 times is assumed is determined to be the true target.

Next, at S90, the new target information generating unit 72 determines whether an unprocessed object signal is present. That is, the new target information generating unit 27 determines whether an object signal that is detected for the first time in the current cycle is present. The new target information generating unit 72 ends the present process when an unprocessed object signal is not present, and proceeds to a process at S100 when an unprocessed object signal is present.

At S100, the new target information generating unit 72 generates a plurality of target candidates regarding which ambiguity in velocity is assumed from the observation value of the unprocessed object signal and ends the present process.

2-2. Filter Process

Figure 5:
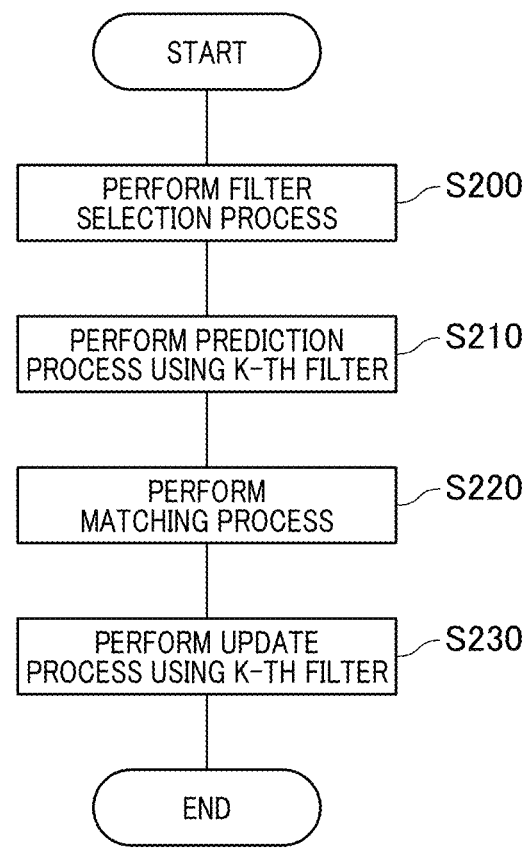
FIG. 5 is a flowchart of a filter process according to the first embodiment.

Next, processing steps in the filter process performed by the object tracking apparatus will be described with reference to a flowchart in FIG. 5.

First, at S200, the filter selecting unit 41 selects a K-th filter processing unit 5K among the first to Nth filter processing units 51 to 5N, where K is an integer from 1 to N. The first to Nth filter processing units 51 to 5N have filters of which state variables differs from one another in number.

Specifically, the first filter processing unit 51 has a filter with fewest state variables and the Nth filter processing unit 5N has a filter with most state variables. In addition, the filter processing units from the first filter processing unit 51 to the Nth filter processing unit have filters with more state variables as an order of the filter processing units increases. According to the present embodiment, the filter is a Kalman filter.

The filter of the first filter processing unit 51 has state variables that are equal to or less in number than the order of the observation values. That is, according to the present embodiment, there are three observation values (that is, the order of the observation values is three). Therefore, the filter of the first filter processing unit has three or fewer state variables.

In addition, the filter of the Nth filter processing unit 5N has state variables that are greater in number than the order of the observation values. That is, according to the present embodiment, the filter of the Nth filter processing unit 5N has four or more state variables.

According to the present embodiment, when N=2, the filter processing unit 50 includes a first filter processing unit 51 and a second filter processing unit 52. In addition, the first filter processing unit 51 has a filter with three state variables. The second filter processing unit 52 has a filter with four state variables.

Figure 10:
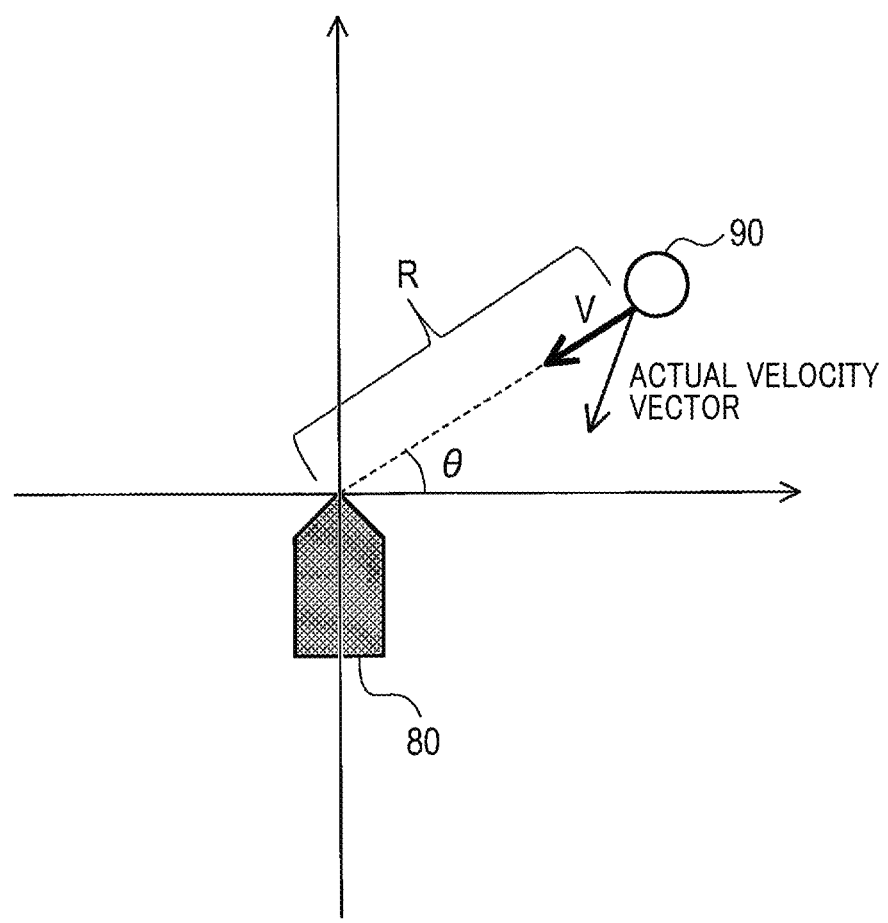
FIG. 10 is a diagram of state variables and an actual velocity vector when the state variables of a filter are a distance, a relative velocity, and an orientation.

As shown in FIG. 10, the state quantities of the filter that has three state variables are a distance R, a relative velocity V, and an orientation θ of the object. Each element of the state quantities is a state variable. In this case, because a space of the state variable coincides with a space of the observation value, the filter process is a linear process. Therefore, computational load of the object tracking apparatus 20 is suppressed.

Figure 11:
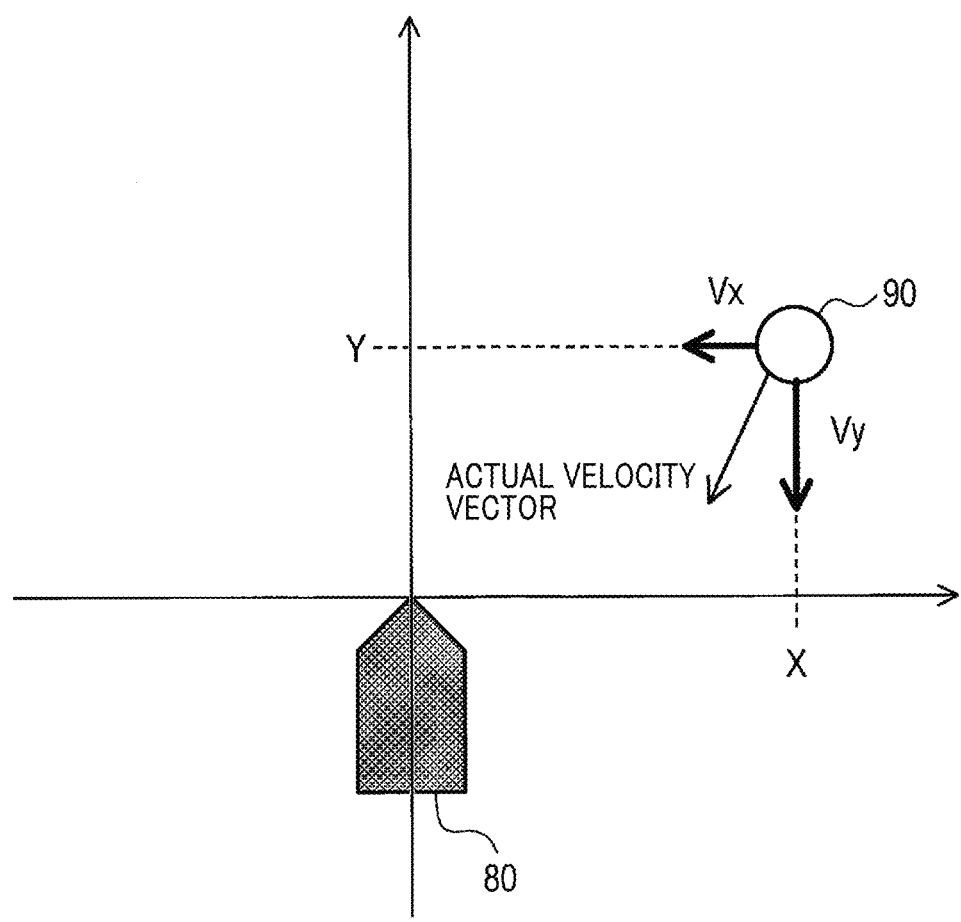
FIG. 11 is a diagram of state variables and an actual velocity vector when the state variables of the filter are an X-coordinate, a Y-coordinate, an X-direction speed, and a Y-direction speed.

Meanwhile, as shown in FIG. 11, the state quantities of the filter that has four state variables are an X-coordinate value, a Y-coordinate value, an X-direction velocity Vx, and a Y-direction velocity Vy. The X-coordinate value is a coordinate value on an X-axis. The Y-coordinate value is a coordinate value on a Y-axis. The X-axis and the Y-axis are orthogonal to each other. In this case, because there are more state variables than observation values, tracking accuracy regarding the target is improved compared to when the filter that has three state variables is used.

As shown in FIG. 10, when the filter that has three state variables is used, the relative velocity V is a value that has no direction and is a projection of an actual velocity vector in a direction of the orientation θ. Therefore, depending on a positional relationship between the vehicle 80 and the other vehicle 90, the relative velocity V may shift from the actual velocity vector.

In contrast, as shown in FIG. 11, when the filter that has four state variables is used, the relative velocity has direction. Therefore, regardless of the positional relationship between the vehicle 80 and the other vehicle 90, the actual velocity vector is obtained when the X-direction velocity and the Y-direction velocity are combined.

However, when the filter that has four state variables shown in FIG. 11 is used, the filter process is a nonlinear process. Therefore, when the filter that has four state variables is used, computational load of the object tracking apparatus 20 increases, compared to when the filter that has three state variables is used.

Figure 12:
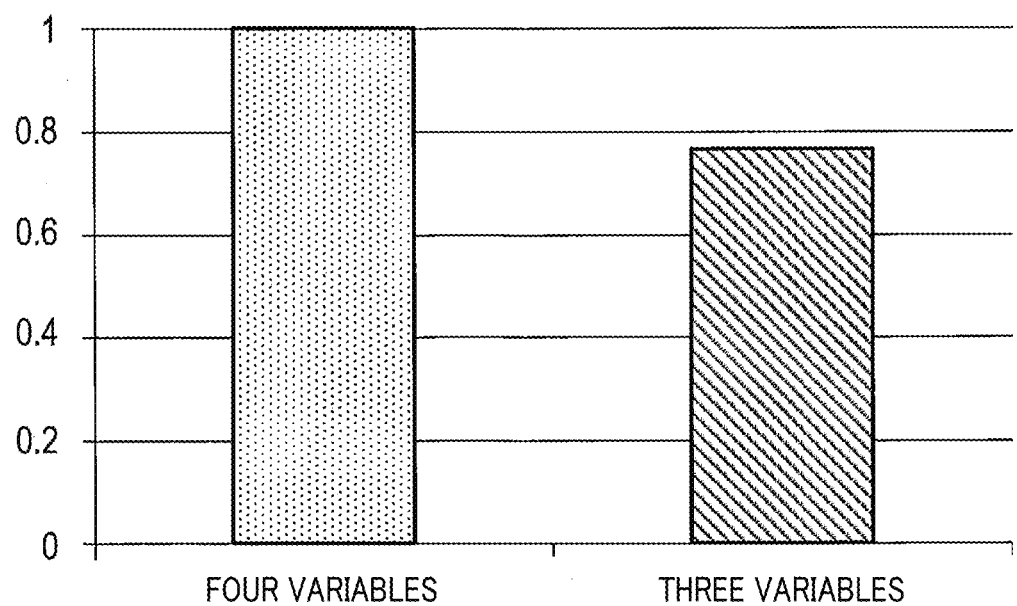
FIG. 12 is a diagram of a comparison of computation time when the state variables of the filter are three variables and computation time when the state variables of the filter are four variables.

FIG. 12 shows computation times when the state variables are four variables and three variables. In FIG. 12, the computation time when the state variables are three variables is relatively shown with the computation time when the state variables are four variables as 1. When the state variables are four variables, computation time increases by less than 30%, compared to when the state variables are three variables.

Here, the filter selecting unit 41 switches the selected filter processing unit to a filter processing unit that has a filter that has more state variables, in response to the target candidate being deleted and the total number of target candidates decreasing. Specifically, the filter selecting unit 41 selects the first filter processing unit 51 before the target candidate becomes one and the true target is determined for a single object.

Then, after the true target is determined, the filter processing unit 41 selects the filter processing unit that has the filter that has the most state variables, that is, the second filter processing unit 52 according to the present embodiment.

Alternatively, the filter selecting unit 41 may select the filter processing unit based on a total number of target candidates generated for all objects that are detected. That is, the filter selecting unit 41 may select the filter processing that has a filter that has a larger number of state variables before the number of target candidates for each object becomes one, when the number of objects that are detected is small.

Next, at S210, the prediction processing unit 61 of the Kth filter processing unit 5K selected at S200 calculates the prediction value of the state quantity in the current cycle from the estimation value of the state quantity of the target candidate in the previous cycle. Expressions (1) to (6) below are expressions that represent an extended Kalman filter.

In expressions (1) to (6): $X_{k|k-1}$ is the prediction value of the state quantity; $X_k$ is the estimation value of the state quantity; $z_k$ is the observation value; $P_{k|k-1}$ is an error variance matrix of the prediction value of the state quantity; $P_k$ is an estimation value of the error variance matrix; $S_k$ is an innovation matrix; $K_k$ is Kalman gain; f is a function that gives the prediction value from the previous state quantity; h is a function that gives the observation value; $Q_k$ is a dispersion of process noise; $F_k$ is a state transition matrix defined by a Jacobian of the function $f$; $R_k$ is an error variance matrix of the observation noise; $H_k$ is a transformation matrix that maps the state space defined by the Jacobian of the function h to the observation space; Xo is an initial value of the state variable (that is, an initial estimation value); and Po is an initial value of the error variance matrix. When the observation value and the state variable are linear, the function h is a linear function. When the observation value and the state variable are nonlinear, the function h is a nonlinear function.

$$X_{k|k-1} = f(X_{k-1}) \tag{1}$$

$$P_{k|k-1} = F_{k-1} P_{k-1} F_{k-1}^T + Q_{k-1} \tag{2}$$

$$S_k = H_k P_{k|k-1} H_k^T + R_k \tag{3}$$

$$K_k = P_{k|k-1} H_k^T S_k^{-1} \tag{4}$$

$$P_k = (I - K_k H_k) P_{k|k-1} \tag{5}$$

$$X_k = X_{k|k-1} + K_k(z_k - h(X_{k|k-1})) \tag{6}$$

At S210, the prediction processing unit 61 calculates the prediction value of the state quantity in the current cycle using expression (1) and calculates the error variance matrix of the prediction value in the current cycle using expression (2).

Next, at S220, the matching unit 62 of the filter processing unit selected at S200 matches the prediction value of the state quantity of the target candidate calculated at S210 and the observation value. For example, the matching unit 62 determines that matching is established when the difference between the prediction value of the state quantity and the observation value is within a predetermined value.

Next, at S230, the update processing unit 63 of the filter processing unit selected at S200 calculates the estimation value of the state quantity in the current cycle from the prediction value of the state quantity and the observation value of which matching is established at S220, using the filter. Specifically, the update processing unit 63 calculates the estimation value of the state quantity in the current cycle using expressions (3) to (6). Here, when matching is not established at S220, the prediction value is the estimation value. The present process is then ended and the object tracking apparatus 20 proceeds to the process at S70.

3. Effects

According to the present embodiment described above, the following effects are achieved.

(1) A plurality of target candidates regarding which ambiguity in velocity is assumed are generated for an object that is detected for the first time. Then, by a single filter processing unit among the first to Nth filter processing units 51 to 5N, the current prediction value of the state quantity is calculated from the past estimation value of the state quantity of each target candidate.

Then, the current estimation value of the state quantity of each target candidate is calculated from the current prediction value of the state quantity and the current observation value that matches the prediction value. That is, each of the target candidates is tracked. Furthermore, the target candidate having the lowest likelihood of being the true target is deleted from the plurality of target candidates.

When the number of target candidates is large, a purpose of tracking the target candidates is to select the true target from the plurality of target candidates. Therefore, tracking accuracy regarding the target may be low. However, because the number of target candidates is large, the computational load of the filter process for each target candidate should be suppressed. Meanwhile, after the number of target candidates becomes one, the purpose of tracking the target candidate is to use tracking information for warnings and vehicle control.

Therefore, the tracking accuracy regarding the target is required to be high. However, because the number of target candidates is one, the computational load of the filter process for the target candidate may be high. Therefore, the filter that is used for the filter process is switched to a filter that has a larger number of state variables in response to the total number of target candidates decreasing. As a result, the target can be tracked with high accuracy while the overall computational load is suppressed.

(2) As a result of the filter that has state variables that are equal to or less in number than observation values being used, the filter process becomes a linear process. Therefore, as a result of the first filter processing unit 51 in which the number of state variables coincide with the number of observation values being selected, the computational load of the filter process can be suppressed.

(3) As a result of the filter that has state variables that is greater in number than the observation values being used, the target can be tracked with accuracy. Therefore, as a result of the second filter processing unit 52 in which the state variables is greater in number than the observation values being selected, the target can be tracked with accuracy.

(4) When the target candidate for a single object signal becomes one, even when the filter that has the most state variables is used, computational load can be suppressed. Therefore, after the target candidate for a single object signal becomes one, the target can be tracked with accuracy as a result of the filter that has a larger number of state variables being used.

(5) As shown in expression (4), the number of state variables and linearity affect even a calculation amount of gain in the Kalman filter. Therefore, a particularly significant effect is achieved when the Kalman filter is applied to the present disclosure.

(6) As a result of the target candidate to be deleted being determined using the matching-established count and/or the difference between the prediction value and the observation value, the target candidate that differs from the true target can be determined with accuracy. Moreover, the true target can be determined with accuracy from the plurality of target candidates.

(7) When the number of objects that are detected is small, even when a plurality of target candidates are present for each object, the overall number of target candidates is relatively small. There may be leeway in the calculation amount in some cases. In such cases, the filter that has a larger number of state variables can be used before the number of target candidates for each object becomes one.

Other Embodiments

An embodiment for carrying out the present disclosure is described above. However, the present disclosure is not limited to the above-described embodiment. Various modifications are possible.

(a) According to the above-described embodiment, the velocity observation value, the distance observation value, and the orientation observation value are calculated from the observation signal. However, the orientation observation value may not be calculated. Although tracking accuracy is higher when the three observation values are calculated, object tracking can be performed even when only the velocity observation value and the distance observation value are calculated.

(b) According to the above-described embodiment, the filter that has four state variables has the X-coordinate value, the Y-coordinate value, the X-direction velocity Vx, and the Y-direction velocity Vy as the state variables. However, the filter may have the X-coordinate value, the Y-coordinate value, the relative velocity V, and the orientation $\theta$ (that is, the velocity direction $\theta$).

(c) According to the above-described embodiment, the filter processing unit 50 includes two filter processing units. However, the filter processing unit 50 may include three or more filter processing units of which state variables differs from one another in number. For example, a filter of which the state quantities are the X-coordinate value, the Y-coordinate, the relative velocity, advancing direction, acceleration, and angular velocity may be used. In this case, tracking that takes into consideration even a turning operation of the vehicle can be performed.

(d) According to the above-described embodiment, the Kalman filter is used as the filter. However, a filter other than the Kalman filter may be used. For example, an $\alpha\beta$ filter or a moving average filter may be used.

(e) According to the above-described embodiment, the FCM-type millimeter-wave radar is used as the sensor. However, the sensor is not limited to the FCM type. All that is required is that the sensor be a millimeter-wave radar of a type in which the relative velocity is determined from the phase rotation. For example, the sensor may be a two-frequency continuous wave (CW)-type millimeter-wave radar. Alternatively, a sensor other than the millimeter-wave radar may be used. For example, a laser radar or an ultrasonic radar may be used. That is, when a sensor of a type in which ambiguity occurs in the observation value of the velocity is used, the present disclosure can be applied.

(f) A plurality of functions provided by a single constituent element according to the above-described embodiments may be actualized by a plurality of constituent elements. A single function provided by a single constituent element may be actualized by a plurality of constituent elements. In addition, a plurality of functions provided by a plurality of constituent elements may be actualized by a single constituent element. A single function provided by a plurality of constituent elements may be actualized by a single constituent element.

Furthermore, a part of a configuration according to the above-described embodiments may be omitted. Moreover, at least a part of a configuration according to an above-described embodiment may be added to or replace a configuration according to another of the above-described embodiments. Any mode included in the technical concept specified by the wordings of the scope of claims is an embodiment of the present disclosure.

(g) The present disclosure can also be actualized by various modes in addition to the above-described object tracking apparatus, such as a system of which the object tracking apparatus is a constituent element, a program for enabling a computer to function as the object tracking apparatus, a non-transitory computer-readable storage medium such as a semiconductor memory that records the program therein, and an object tracking method.

What is claimed is:

1. An object tracking apparatus comprising:
   memory including one or more computer programs stored thereon; and
   one or more processors configured to execute the one or more computer programs to cause performance of operations, the operations comprising:
     detecting an object that is present in a vicinity of a sensor from sensor information detected by the sensor;
     calculating a relative velocity of the object relative to the sensor as one observation value for each detected object;
     calculating a distance from the sensor to the object as one observation value for each detected object;
     generating a plurality of target candidates in which ambiguity in velocity is assumed for an object that is detected for a first time;
     calculating a current prediction value of a state quantity of each target candidate from a past estimation value of the state quantity of each target candidate, the calculating using one filter among a plurality of filters having state variables that differ from each other in number;
     matching each prediction value of a state quantity of the target candidate and a current observation value including the relative velocity of the object relative to the sensor as calculated and the distance from the sensor to the object as calculated;
     calculating a current estimation value of the state quantity of the target candidate from each of the calculated prediction values and the current observation value that matches each prediction value;
     determining a likelihood of each of the plurality of target candidates generated for a single detected object being a true target;
     deleting a target candidate of which the determined likelihood is less than a preset threshold among the plurality of target candidates, or deleting a predetermined number of target candidates in order from the target candidate of which the likelihood is lowest among the plurality of target candidates; and
     switching the filter used to a filter that has a larger number of state variables among the plurality of filters, in response to the target candidate being deleted and the total number of target candidates decreasing.

2. The object tracking apparatus according to claim 1, wherein:
   the filter that has fewest state variables among the plurality of filters has state variables that are equal to or less in number than an order of the observation values.

3. The object tracking apparatus according to claim 2, wherein:
   the filter that has most state variables among the plurality of filters has state variables that are greater in number than the order of the observation values.

4. The object tracking apparatus according to claim 3, wherein the operations further comprise:
   using the filter that has the most state variables among the plurality of filters, in response to the target candidates generated for the single detected object becoming one.

5. The object tracking apparatus according to claim 4, wherein the operations further comprise:
   calculating an orientation of the object relative to the sensor as one observation value for each detected object, wherein
   the filter that has the fewest state variables among the plurality of filters includes at least one of the distance, the relative velocity, and the orientation of the object among the state variables.

6. The object tracking apparatus according to claim 5, wherein:
   the filter that has the most state variables among the plurality of filters includes an X-coordinate value and a Y-coordinate value, and further has either an X-direction velocity and a Y-direction velocity, or a velocity and a velocity direction among the state variables.

7. The object tracking apparatus according to claim 6, wherein:
   the plurality of filters include a Kalman filter.

8. The object tracking apparatus according to claim 7, wherein:
   the determining of the likelihood is based on one or more of:
     a matching-established count between the prediction value of the target candidate and the current observation value, or
     a difference between the prediction value and the current observation value.

9. The object tracking apparatus according to claim 8, wherein the operations further comprise:
   selecting a filter to be used among the plurality of filters based on a total number of target candidates.

10. The object tracking apparatus according to claim 1, wherein:
    the filter that has the most state variables among the plurality of filters has state variables that are greater in number than the order of the observation values.

11. The object tracking apparatus according to claim 1, wherein the operations further comprise:
    using the filter that has the most state variables among the plurality of filters, in response to the target candidates generated for the single detected object becoming one.

12. The object tracking apparatus according to claim 1, wherein the operations further comprise:

calculating an orientation of the object relative to the sensor as one observation value for each detected object, wherein the filter that has the fewest state variables among the plurality of filters includes at least one of the distance, the relative velocity, and the orientation of the object among the state variables.

13. The object tracking apparatus according to claim 1, wherein:

the filter that has the most state variables among the plurality of filters includes an X-coordinate value and a Y-coordinate value, and further has either an X-direction velocity and a Y-direction velocity, or a velocity and a velocity direction among the state variables.

14. The object tracking apparatus according to claim 1, wherein:

the plurality of filters include a Kalman filter.

15. The object tracking apparatus according to claim 1, wherein:

the determining of the likelihood is based on one or more of:

a matching-established count between the prediction value of the target candidate and the current observation value, or a difference between the prediction value and the current observation value.

16. The object tracking apparatus according to claim 1, wherein the operations further comprise:

selecting a filter to be used among the plurality of filters based on a total number of target candidates.

* * * * *